United States Patent [19]

Srinivasan

[11] Patent Number: 6,072,862
[45] Date of Patent: *Jun. 6, 2000

[54] ADAPTABLE METHOD AND SYSTEM FOR MESSAGE DELIVERY

[76] Inventor: Thiru Srinivasan, 9675 S. Redoakes Pl., Highlands Ranch, Colo. 80126

[*] Notice: This patent issued on a continued prosecution application filed under 37 CFR 1.53(d), and is subject to the twenty year patent term provisions of 35 U.S.C. 154(a)(2).

[21] Appl. No.: 08/674,437

[22] Filed: Jul. 2, 1996

[51] Int. Cl.[7] ................................. H04M 11/00
[52] U.S. Cl. ................. 379/100.08; 379/93.24; 379/88.13
[58] Field of Search ............. 379/88, 89, 90.01, 379/93.01, 93.14, 93.15, 93.17, 93.24, 100.01, 100.08, 100.09, 88.12, 88.13, 88.14, 88.22, 88.23, 88.18; 358/402, 407

[56] References Cited

U.S. PATENT DOCUMENTS

| | | | |
|---|---|---|---|
| 4,837,798 | 6/1989 | Cohrn et al. | 379/88 |
| 4,996,707 | 2/1991 | O'Malley et al. | |
| 5,031,206 | 7/1991 | Riskin | |
| 5,091,931 | 2/1992 | Milewski | |
| 5,175,760 | 12/1992 | Ohashi et al. | 379/88.27 |
| 5,265,033 | 11/1993 | Vajk et al. | |
| 5,278,955 | 1/1994 | Forte et al. | |
| 5,333,266 | 7/1994 | Boaz et al. | |
| 5,349,636 | 9/1994 | Irribarren | |
| 5,381,466 | 1/1995 | Shibayama et al. | |
| 5,381,527 | 1/1995 | Inniss et al. | |
| 5,406,557 | 4/1995 | Baudoin | |
| 5,434,910 | 7/1995 | Johnson et al. | |
| 5,550,900 | 8/1996 | Ensor et al. | 379/74 |
| 5,559,721 | 9/1996 | Ishii | 364/514 |
| 5,659,599 | 8/1997 | Arumainayagam et al. | 379/89 |
| 5,675,507 | 10/1997 | Bobo, II | 364/514 |
| 5,742,905 | 4/1998 | Pepe et al. | 455/455 |

FOREIGN PATENT DOCUMENTS

| | | |
|---|---|---|
| 0169262 | 9/1984 | Japan. |
| 0046857 | 2/1988 | Japan. |
| 0050245 | 3/1988 | Japan. |
| 0126054 | 5/1989 | Japan. |
| 403256426 | 11/1991 | Japan. |

*Primary Examiner*—Curtis A. Kuntz
*Assistant Examiner*—Melur Ramakrishnaiah

[57] ABSTRACT

An adaptable message delivery method and system. The method includes providing a mailbox capable of receiving multiple messages having different types, and preselecting one of multiple destinations for a message received by the mailbox, the destinations also having different types. The method also includes transmitting the message received by the mailbox to the destinations selected. The system includes a mailbox and controller for performing the method.

16 Claims, 1 Drawing Sheet

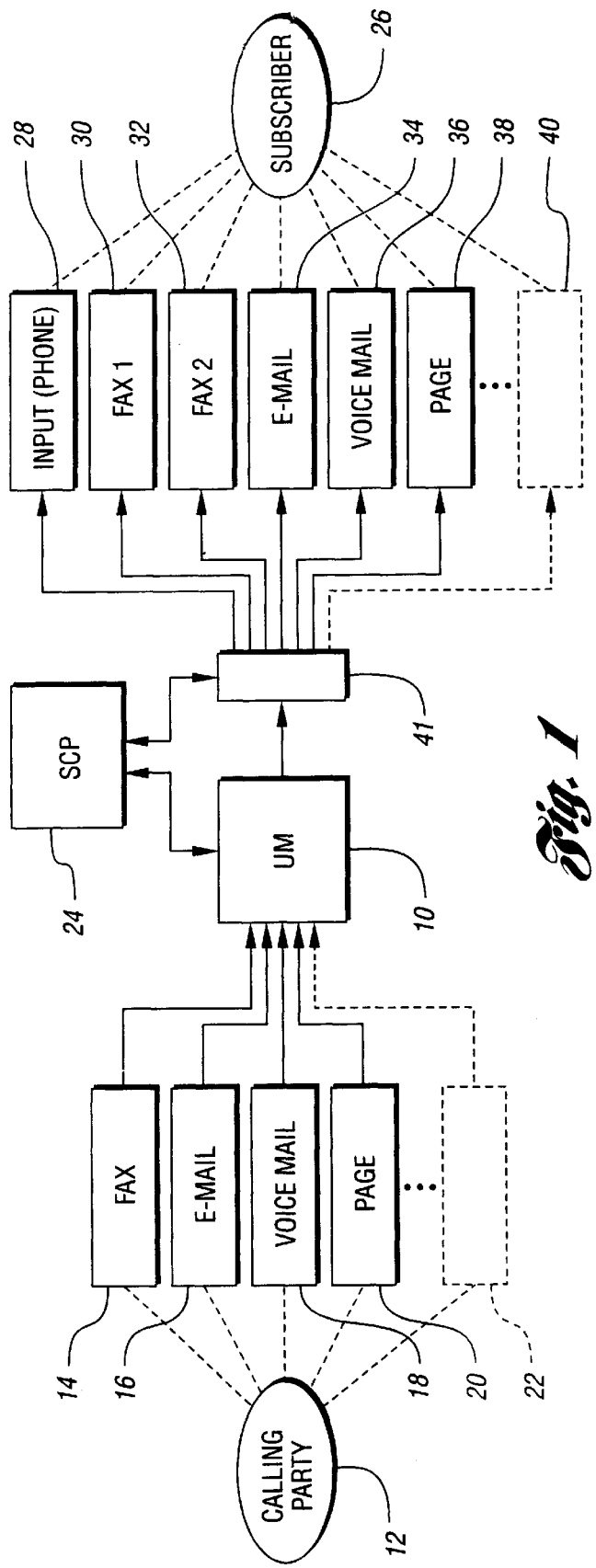

ADAPTABLE METHOD AND SYSTEM FOR MESSAGE DELIVERY

TECHNICAL FIELD

This invention relates to an adaptable method and system for delivering messages of multiple types of media to a subscriber.

BACKGROUND ART

A number of different types of message delivery systems are well known in the art. Such systems may utilize a variety of media formats, including facsimile, voice-mail, electronic mail (e-mail), and paging. Such systems, particularly those having voice and facsimile mail capabilities, may also provide an "Out Calling" feature. This feature, when selected by a mailbox owner, initiates an automatic call to a number pre-programmed by the mailbox owner whenever a message is received in the mailbox.

It is also well known in the art to provide for conversion between information in different media formats, depending upon user preference. In that regard, U.S. Pat. Nos. 4,996,707 issued to O'Malley et al. and 5,091,931 issued to Milewski provide for text to speech and facsimile to speech conversion, respectively.

In light of this prior art, Message Transfer and Routing Systems (MTRS) have been developed that attempt to integrate known message delivery systems and media conversion techniques. More particularly, U.S. Pat. No. 4,837,798 issued to Cohen et al. discloses a communication system having unified messaging.

As seen therein, messages having various media formats may be received in a mailbox. The mailbox owner may designate a particular media system for delivery of an indication that a message has been received. If desired, the mailbox owner may subsequently request that the message be transmitted to the designated media system, which may include conversion of the message from one media format to that of the designated media system. Thus, messages may be reviewed by a mailbox owner at a single point of contact.

Such message delivery systems, however, still suffer from a variety of problems. More specifically, such systems fail to provide optimum flexibility for routing of different types of messages. For example, such systems lack the capability to allow a mailbox owner to preselect specific destinations for delivery of a message, where the preselected destination depends upon various subscriber designated parameters such as the type of message, date, and time of day.

DISCLOSURE OF INVENTION

Accordingly, it is the principle object of the present invention to provide an improved method and system for delivering a message.

Another object of the present invention is to provide an automated method and system for delivering a message that is adaptable to various parameters including types of messages, types of destinations, and times for transmission and receipt of messages.

According to the present invention, the method comprises providing a mailbox capable of receiving a plurality of messages, the plurality of messages having a plurality of types, and preselecting one of a plurality of destinations for a message received by the mailbox, the plurality of destinations having a plurality of types. The method further comprises transmitting the message received by the mailbox to the one of the plurality of destinations preselected.

The system of the present invention comprises a mailbox capable of receiving a plurality of messages, the plurality of messages having a plurality of types, and a controller for preselecting one of a plurality of destinations for a message received by the mailbox, the plurality of destinations having a plurality of types. The system further comprises means for transmitting the message received by the mailbox to the one of the plurality of destinations preselected.

These and other objects, features and advantages will be readily apparent upon consideration of the following detailed description in conjunction with the accompanying drawings.

BRIEF DESCRIPTION OF DRAWINGS

FIG. 1 is a block diagram of the system of the present invention; and

FIG. 2 is a flowchart of the method of the present invention.

BEST MODE FOR CARRYING OUT THE INVENTION

In general, the present invention provides unified access for a subscriber to information in the format desired by the subscriber, irrespective of the format in which the information was delivered. For example, a facsimile message comprising text can be converted to digital speech and retrieved by a subscriber who, not having access to a facsimile machine at the time the information is needed, obtains the information via voice mail. In such a fashion, the present invention improves the ability of a subscriber to acquire information through electronic communication by allowing messages to be sent and received from personal computers, telephones, facsimile machines, or other portable devises using existing public or private facilities.

To do so, the present invention provides a sender with a single subscriber number to call in order to send or leave a message. Both the sender and a subscriber may select their preferred medium of communication. If the two are different, the present invention provides the necessary conversion. In addition, the present invention can notify a subscriber when a message has been received via the subscriber's preferred "message waiting" notification mechanism. Finally, messages can be stored, routed, or communicated to other subscribers. In such a fashion, the present invention provides for sending and receiving messages anywhere, at any time, in any form.

More particularly, the present invention provides a method and system whereby a subscriber may automatically and in a predetermined fashion direct the routing of messages having any of a number of different media formats including, but not limited to, facsimile, page, voice mail, electronic mail (e-mail), video mail, and other types of media. Messages may be routed to a variety of different types of destinations also including, but not limited to, facsimile machines, pager systems, voice mail systems, e-mail systems, video mail systems, and others. Specific destinations are preselected before receipt of the messages depending upon various subscriber designated parameters such as the type of message, date, and time of day.

For example, between the hours of 8:00 a.m and 5:00 p.m., all facsimile messages could be routed to an office facsimile machine. At all other times, all facsimile messages could be routed to a home facsimile machine. Similar routing could also be established for voice mail or e-mail messages. In such a fashion, a subscriber is relieved from the requirement and associated equipment for calling in to check various types of messages such as voice mail, facsimile, e-mail, etc.

Referring now to FIG. 1, a block diagram of the system of the present invention is shown. As seen therein, in the preferred embodiment, the system comprises a "multimedia" or "universal" mailbox (UM) (10). Mailbox (10) is "multi-media" or "universal" in that it is capable of receiving and storing messages in a wide variety of media formats. That is, mailbox (10) is capable of receiving and storing messages from a calling party (12) via any of a number of devices, including facsimile machines (14), e-mail systems (16), voice mail systems (18), pager systems (20) (including alpha-numeric characters), as well as other systems (22) well known in the art.

Mailbox (10) is also provided in communication with a Service Control Point (SCP) (24) in an Advanced Intelligent Network (AIN), which provides a subscriber (26) with the ability to receive the messages described above. In that regard, SCP (24) is itself provided in communication with an input device (28), which preferably comprises a touch-tone telephone, although other types of input devices compatible with SCP (24) may also be used. Via input device (28), subscriber (26) remotely accesses and programs SCP (24) with specific instructions for automatic routing of messages later received by mailbox (10).

More specifically, subscriber (26) may direct SCP (24) to route any message received by mailbox (10) to any number of devices including facsimile machines (30, 32), e-mail systems (34), voice mail systems (36), pager systems (38), as well as other systems (40) well known in the art to which the subscriber and/or any other entity has access. The specific destination (30, 32, 34, 36, 38, 40) for a message from mailbox (10) may depend upon any of a number of parameters programmed by subscriber (26) into SCP (24) via input device (28). Such parameters include, but are not limited to, type of message received in mailbox (10) (i.e., facsimile, voice mail, e-mail, video mail, page, etc.), type of specific destination (30, 32, 34, 36, 40) to which the message from mailbox (10) is to be delivered, time and/or date of receipt of the message, and time and/or date for transmission of the message.

For instance, subscriber (26) may program SCP (24) to route all facsimile messages received by mailbox (10) to either facsimile machine (30) or (32), where the particular machine selected depends upon the time and/or date of receipt, as previously described. Alternatively, subscriber (26) may also program SCP (24) to route all facsimile messages received by mailbox (10) during a first preselected period of time to facsimile machine (30) at a later preselected time. In such an example, mailbox (10) stores all facsimile messages received during the first preselected period of time for later transmission.

The present invention also provides for conversion of messages from one type of media format to another. As a result, depending upon the preferred or available media, subscriber (26) may also program SCP (24) to route all messages received by mailbox (10) to subscriber (26) via voice mail system (36). In such an example, SCP (24) instructs mailbox (10) to convert non voice mail messages to voice mail before SCP (24) routes such messages to subscriber (26).

It should be noted that the message conversion provided by mailbox (10) may be between any types of media and/or protocol formats. That is, such conversion may be voice mail to voice mail, voice mail or other media "tagging" of other types of messages (e.g., "message waiting" notification), text to voice mail, e-mail to e-mail, text to facsimile transmission, e-mail to facsimile transmission, facsimile transmission overflow, voice mail to text, as well as others. Thus, as desired, subscriber (26) may receive text copies of voice mail messages, or have electronic mail or facsimile transmissions read via voice mail.

In operation, when any type of message is received, mailbox (10) makes a telephone call to a special number that triggers a switch (not shown) sending a query message to SCP (24). Using an Intelligent Peripheral System (IPS) (not shown), SCP (24) plays a standard message that asks the caller, in this case mailbox (10), to input the type (pager, facsimile mail, voice mail, video mail, or e-mail) of the message that needs to be routed.

After the mailbox (10) inputs the type of message, SCP (24) executes internal call processing logic (not shown) to determine the routing destination (30, 32, 34, 36, 38, 40). Such processing also utilizes one or more of the subscriber pre-designated parameters previously described, such as time, date, the type of message received in mailbox (10) and/or the type of destination (30, 32, 34, 36, 38, 40) to which the message from mailbox (10) is to be delivered. Based on the results of such processing, SCP (24) utilizes conventional routing facilities (41) to connect mailbox (10) to the appropriate destination (30, 32, 34, 36, 38, 40) in order to transmit the message.

Such interaction between SCP (24) and mailbox (10) includes well known techniques for communication with facsimile, pager, and other systems. For instance, SCP (24) supplies mailbox (10) with the appropriate telephone number for such systems, which mailbox (10) captures and dials to establish a connection for delivery of the message. In that regard, mailbox (10) is capable of recognizing speech and/or tones from such systems, after which the message is transmitted.

Referring next to FIG. 2, a flowchart of the method of the present invention is shown. As seen therein, with continuing reference to FIG. 1, the method comprises providing (50) a mailbox (10) capable of receiving a plurality of messages, the plurality of messages having a plurality of types. The method further comprises preselecting (52) one of a plurality of destinations (30, 32, 34, 36, 38, 40) for a message received by the mailbox (10), the plurality of destinations (30, 32, 34, 36, 38, 40) having a plurality of types. The method still further comprises transmitting (54) the message received by the mailbox (10) to the one of the plurality of destinations (30, 32, 34, 36, 38, 40) preselected.

As is readily apparent from the foregoing description of the present invention, calling party (12) need only know a single subscriber telephone, identification, or access number to leave any kind of message in mailbox (10) for delivery to subscriber (26). Moreover, once SCP (24) has been programmed, subscriber (26) need not call in from remote locations to check for message arrival.

Indeed, by linking voice mail, e-mail, facsimile and other message services, the present invention not only enables a subscriber to send and receive information in whatever form desired, regardless of the form in which the information was sent, but also enables a subscriber to use a single telephone number for access to all such services. Instead of checking voice mail, facsimile mail or electronic mail separately, a subscriber need only access mailbox (10) for the message itself or for "tagging" of other types of messages (e.g., "message waiting" notification).

The method and system of the present invention are designed for use with existing voice mail, facsimile mail, e-mail and other systems, as well as their associated network and transmission facilities, without displacement or modification. In such a fashion, the present invention provides increased utility and access, as well as cost effectiveness.

More specifically, the Customer Provided Equipment (CPE) components are the same as used today. These include, but are not limited to, telephones, facsimile machines, and personal computers or other e-mail terminals.

Network components include an Intelligent Peripheral System (IPS) with subtending storage and conversion systems. Such subtending systems include media conversion of text to speech and speech to text, as well as protocol conversion within product class. For example, text to text format conversion to accommodate system disparity between Simple Mail Transfer Protocol (SMTP) and Novell Message Handling Service (MHS) e-mail communication requirement.

Additional subtending systems provide unified access for a subscriber. That is, a subscriber need not invoke discrete access methodologies for voice mail, facsimile transmission mail, and e-mail. Such systems still further provide mailbox networking and routing which provides message confirmation and management features such as unicast, multicast, and broadcast functionality enabling a broader population to more fully participate in electronic communications.

Finally, the method and system of the present invention are also designed for use with existing transmission facilities. Such facilities may be either public or private. These would include appropriate facilities for transmission of e-mail, such as the Internet. In that regard, the SCP (24) provides mailbox (10) with the e-mail address, which mailbox (10) captures and uses for transmission over the appropriate facility. While designed for use with existing transmission facilities, however, those of ordinary skill in the art will recognize that other transmission facilities may also be utilized.

In such a fashion, the present invention solves the problems discussed above associated with prior art messaging systems. More specifically, the method and system of the present invention provide flexible routing of different types of messages. Indeed, routing destinations can be preprogrammed by a subscriber at will via touch-tone telephone service. Moreover, with the method and system of the present invention, a subscriber need not call in to check for messages.

The present invention also provides an integrated method and system for delivery of many different types of messages. Nevertheless, the method and system of the present invention could also be used by the disparate messaging systems (voice mail, facsimile mail, etc.) available today for routing messages.

Still further, the method and system of the present invention provide total transparency of telephone numbers. That is, callers need not know the individual phone numbers of facsimile machine, voice mail, video mail, and pager of a subscriber. Instead, callers need know only a subscriber's mailbox number to call and leave any type of message.

As is readily apparent from the foregoing description, then, the present invention provides an improved method and system for delivering a message. More specifically, the present invention provides an automated method and system for delivering a message that is adaptable to various parameters including types of messages, types of destinations, and times for transmission and receipt of messages.

It is to be understood that the present invention has been described in an illustrative manner and the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described.

What is claimed is:

1. An adaptable method for delivering a message to a user, the method comprising:

providing a mailbox capable of receiving a plurality of messages for the user, the plurality of messages having a plurality of types;

preselecting prior to receipt of a message by the mailbox, based on a first user designated parameter, one of a plurality of destinations associated with the user for a message received by the mailbox, the plurality of destinations having a plurality of types, wherein the first user designated parameter is the type of the message received by the mailbox;

converting the type of the message received by the mailbox to the type of the one of the plurality of destinations preselected; and transmitting the converted message received by the mailbox to the user at the one of the plurality of destinations preselected.

2. The method of claim 1 wherein the plurality of types of messages includes facsimile transmissions, pages, voice mail, video mail and electronic mail.

3. The method of claim 1 wherein the plurality of types of destinations includes facsimile machines, pagers, telephones, video mail terminals, and electronic mail terminals.

4. The method of claim 1 wherein preselecting one of the plurality of destinations for a message received by the mailbox further depends on a second user designated parameter, wherein the second user designated parameter is the time of receipt of the message by the mailbox.

5. The method of claim 1 further comprising:

preselecting a time for transmitting the message received by the mailbox to the one of the plurality of destinations preselected; and storing the message for transmission at the preselected time.

6. The method of claim 5 wherein the time preselected for transmitting the message received by the mailbox to the one of the plurality of destinations preselected depends on the type of the message received.

7. The method of claim 5 wherein the time preselected for transmitting the message received by the mailbox to the one of the plurality of destinations preselected depends on the time of receipt of the message.

8. The method of claim 1 further comprising:

preselecting one of the plurality of destinations for an indicator of the message; and transmitting the indicator to the one of the plurality of destinations preselected upon receipt of the message.

9. An adaptable system for delivering a message to a user, the system comprising:

a mailbox capable of receiving a plurality of messages for the user, the plurality of messages having a plurality of types;

a controller for preselecting prior to receipt of a message by the mailbox, based on a first user designated parameter, one of a plurality of destinations associated with the user for a message received by the mailbox, the plurality of destinations having a plurality of types, wherein the first user designated parameter is the type of the message received by the mailbox and;

means for converting the type of the message received by the mailbox to the type of the one of the plurality of destinations preselected; and means for transmitting the converted message received by the mailbox to the user at the one of the plurality of destinations preselected.

10. The system of claim 9 wherein the plurality of types of messages includes facsimile transmissions, pages, voice mail and electronic mail.

11. The system of claim 9 wherein the plurality of types of destinations includes facsimile machines, pagers, telephones and electronic mail terminals.

12. The system of claim 9 wherein preselecting one of the plurality of destinations for a message received by the mailbox further depends on a second user designated parameter, wherein the second user designated parameter is the time of receipt of the message by the mailbox.

13. The system of claim 9 further comprising:

means for preselecting a time for transmitting the message received by the mailbox to the one of the plurality of destinations preselected; and means for storing the message for transmission at the preselected time.

14. The system of claim 13 wherein the time preselected for transmitting the message received by the mailbox to the one of the plurality of destinations preselected depends on the type of the message received.

15. The system of claim 13 wherein the time preselected for transmitting the message received by the mailbox to the one of the plurality of destinations preselected depends on the time of receipt of the message.

16. The system of claim 15 further comprising:

means for preselecting one of the plurality of destinations for an indicator of the message; and means for transmitting the indicator to the one of the plurality of destinations preselected upon receipt of the message.

\* \* \* \* \*